United States Patent [19]
Crawford

[11] Patent Number: 4,965,462
[45] Date of Patent: Oct. 23, 1990

[54] STAND-BY POWER SUPPLY
[75] Inventor: James J. Crawford, Ringwood, N.J.
[73] Assignee: Frezzolini Electronics Inc., Hawthorne, N.J.
[21] Appl. No.: 90,935
[22] Filed: Aug. 31, 1987
[51] Int. Cl.$^5$ .......................... H02J 7/00; H01M 10/44
[52] U.S. Cl. ......................................... 307/66; 307/85; 358/909; 320/2
[58] Field of Search ........................ 307/66, 64, 85, 86; 358/186, 229, 909, 906; 354/484; 320/2, 17, 29, 35

[56] References Cited
U.S. PATENT DOCUMENTS

| | | | |
|---|---|---|---|
| 3,710,134 | 1/1973 | Guthart | 307/66 |
| 4,044,268 | 8/1977 | Hammel et al. | 307/66 |
| 4,315,162 | 2/1982 | Ferguson | 307/66 |
| 4,662,736 | 5/1987 | Taniguchi et al. | 307/66 X |
| 4,697,909 | 10/1987 | Machida et al. | 354/484 |
| 4,712,196 | 12/1987 | Uesugi | 307/66 X |

Primary Examiner—William M. Shoop, Jr.
Assistant Examiner—Sharon D. Logan
Attorney, Agent, or Firm—McAulay, Fields, Fisher, Goldstein & Nissen

[57] ABSTRACT

A stand-by power supply for preventing interruption of power to a communication unit, has a first connector for electrically connecting to the unit, a second connector for electrically connecting to and disconnecting from a main battery, an auxiliary battery, and a circuit electrically connected to the first and second connectors and the auxiliary battery for applying the main battery across the load, and responsive to the disconnecting of the main battery from the second connector to apply the auxiliary battery across the first connector.

11 Claims, 2 Drawing Sheets

FIG.1
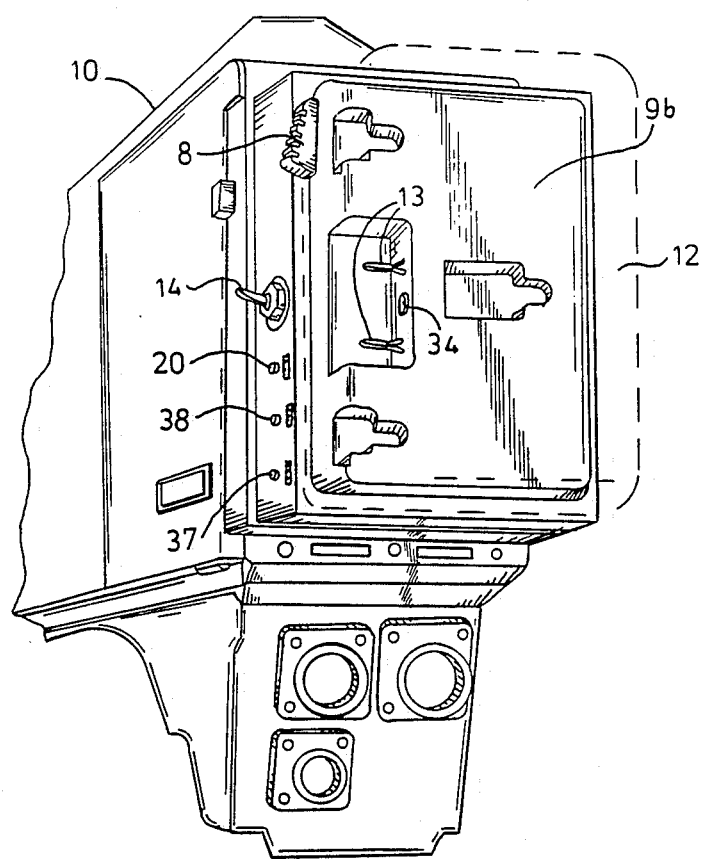
FIG.2
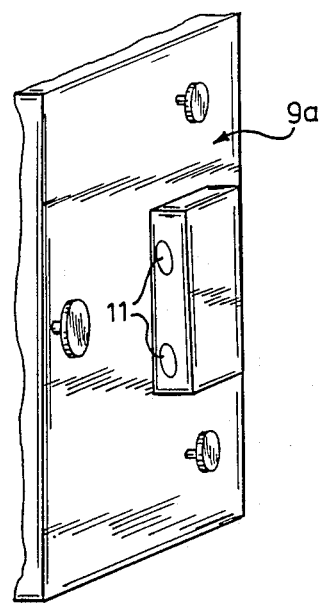
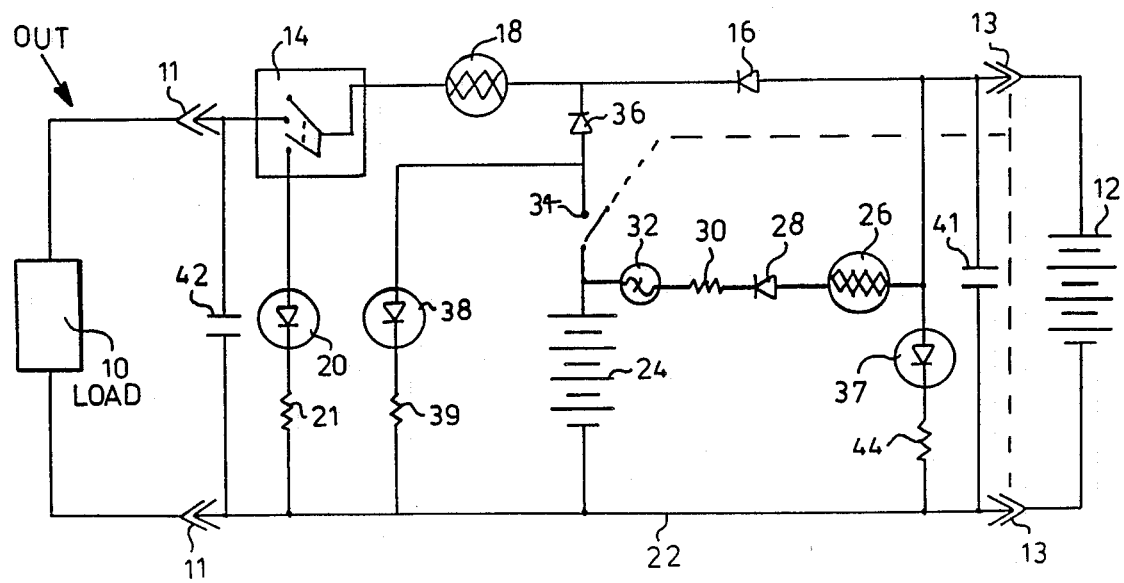
FIG.3

STAND-BY POWER SUPPLY

BACKGROUND OF THE INVENTION

The present invention relates to a stand-by power supply for communication equipment such as TV cameras, recorders and the like.

While communication equipment can be powered by a battery pack so as to enable the mobility thereof during use, a problem that occurs is the interruption of power when the battery pack has to be charged. This interruption may require the recalibration of the camera, the interruption of shooting and the loss of time. This can be extremely disadvantageous if important action is being filmed which cannot be stopped to wait for the change of the battery pack. This problem takes on significant proportions when a news event is being filmed.

SUMMARY OF THE INVENTION

The main object of the present invention is to provide a stand-by power supply which provides for uninterrupted power to a communication device.

This and other objects of the present invention are achieved in accordance with the present invention by a standby power supply in accordance with the present invention which can be mounted between a main battery and a load and which can supply power uninterruptedly when the main battery is removed for replacement.

In accordance with the invention, the load, which may be a TV camera, recorder or other type of communication equipment, is connected to the stand-by power supply via the conventional banana jacks that are normally associated with such connection. Similarly, the main battery, which may be an on-board battery, is also connected to the unit through the banana jacks.

In a preferred embodiment of the present invention, the stand-by power supply is configured as an interface with male and female type banana jacks or comparable connections, so the stand-by unit is physically connected between an onboard battery and a camera.

The circuitry according to the present invention has a main battery connected to the load through a main line including a Schottky blocking diode, a solid state circuit breaker and a conventional on-off multi-contact switch. The solid state circuit breaker is adapted to open the circuit when the current exceeds a predetermined value. When the switch is thrown to the "on" position, an LED indicator is connected across the main line and to a return lead to indicate that the main battery power is on.

The stand-by power supply includes an auxiliary battery connected to the main battery in a trickle charging circuit through a second solid state circuit breaker, a blocking diode, a current limiting resistor and a thermal detection cut-out switch. The thermal detection cut-out switch is mounted on the battery casing to prevent overcharging. Thus, if the auxiliary battery begins to heat up during overcharging, this is sensed by the switch and at a predetermined temperature the switch will open thereby opening the charging circuit.

The main battery may comprise twelve 4 amperehour batteries whereas the auxiliary battery may comprise ten ½ ampere-hour cells.

When the battery indicator shows that the power in the main battery has decreased below an appropriate level, the main battery is removed and this causes automatic closure of the microswitch, thereby connecting the auxiliary battery to the load through a blocking diode, circuit breaker and the on-off multi-contact switch. Additionally, an LED indicator indicates that auxiliary power is on.

The auxiliary battery will drive the camera for anywhere from 3 to 16 minutes during which time a fully charged main battery may be connected to the circuitry.

These and other features and advantages of the present invention will become more apparent from the foregoing disclosure taken with the attached drawings, wherein:

BRIEF DESCRIPTION OF THE DRAWINGS

FIG. 1 is a perspective view of the present invention in use on the back of a video camera;

FIG. 2 is a perspective view of the connection on one side of the device shown in FIG. 1;

FIG. 3 is a schematic of the circuit of the device according to the present invention.

DETAILED DESCRIPTION OF THE INVENTION

Figure 4:
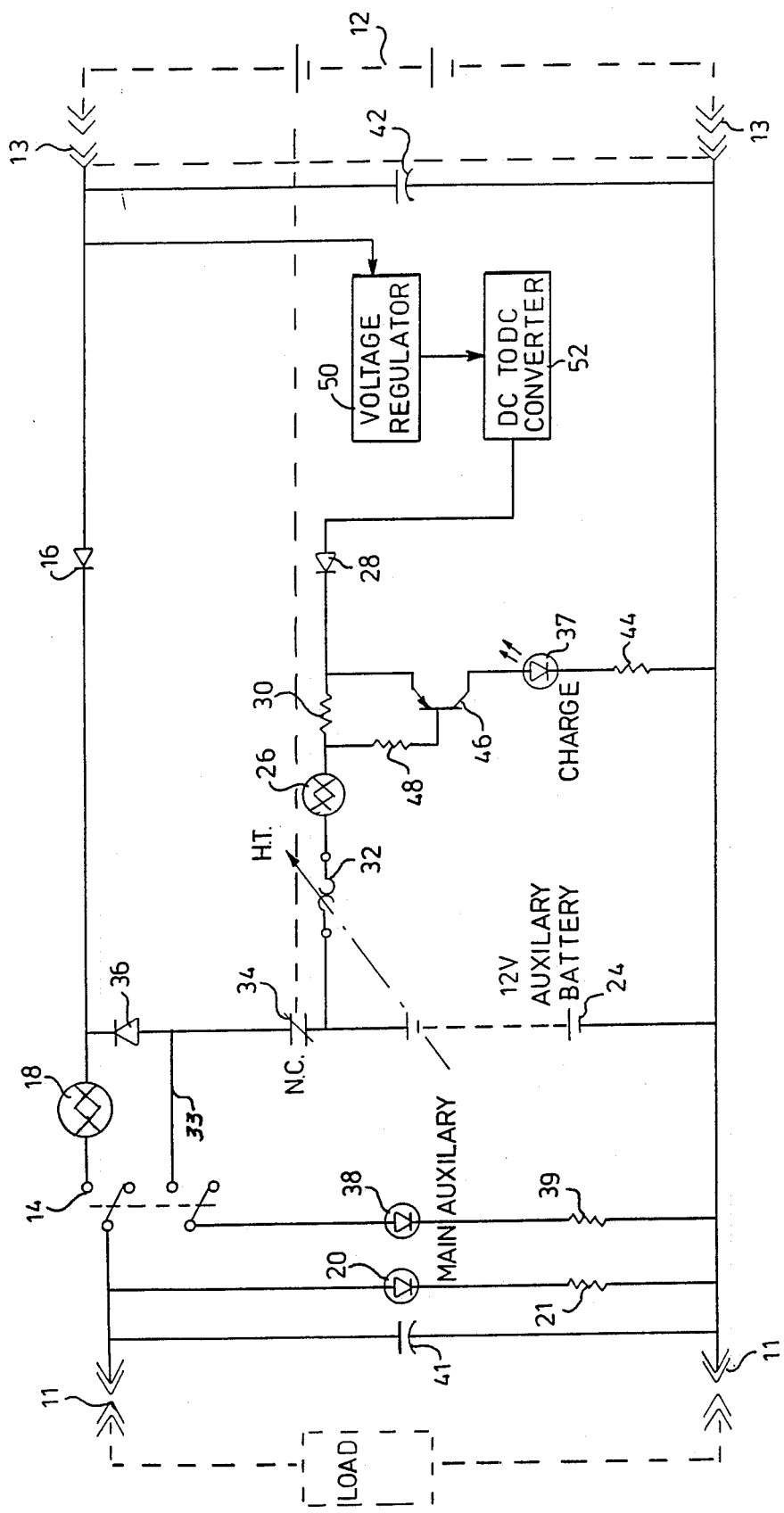
FIG. 4 is a schematic diagram of a modified embodiment of the circuit shown in FIG. 3.

In the embodiment of the present invention, as shown in FIG. 1, the stand-by power supply in accordance with the present invention is configured as an interface 8 that is mounted between a camera 10 and its standard battery pack 12. Professional video cameras use a so-called Anton-Bauer connection for battery packs, with the camera having one-half of the Anton-Bauer connection and the on board battery pack 12 having the other half of the Anton-Bauer connection. In order to make the present invention a mechanical interface between the two, the interface 8 has one half of the AntonBauer connection 9b on one face thereof and the other half of the Anton-Bauer connection 9a shown in FIG. 2 on the other face thereof. The interface 8 is then sandwiched between the camera back and the battery pack 12. The interface 8 includes banana plugs 13 for connecting to the battery 12 and banana jacks 11 for connecting to the corresponding banana plugs on the camera back.

It will be understood by those skilled in the art that the present invention will be modified to operate with other types of communication equipment such as recorders and other types of TV cameras having other kinds of connectors or it may be built directly into the camera.

Interface 8 also includes a microswitch 34 which is depressed by the battery pack 12 to the open state when the battery pack 12 is connected in place on the interface 8. The stand-by power supply interface 8 also includes an on-off switch 14 and three indicator LED's 20, 37 and 38 which will be described hereinafter with respect to FIG. 3.

As shown in FIG. 3, the connectors 11 are connected to a load, which in the case of FIG. 1 is a television or video camera, but which can be any type of communication equipment such as a recorder or radio, etc. Similarly, the main on-board battery 12 is connected to the circuit through connectors 13. The main on-board battery 12 is, for example, a NiCd rechargeable battery.

The circuit further includes the conventional onoff multicontact switch 14. The main battery 12 is connected to the load 10 through a Schottky blocking diode 16, a solid state circuit breaker 18 and switch 14. Switch 14 is shown in the open state in FIG. 3. The solid state circuit breaker 18 is adapted to open the circuit when the current exceeds a predetermined value. Such a device is sold under the trademark Polyswitch TM by Raychem.

The circuit also includes LED indicator 20, and its serially connected current limiting resistor 21, which is connected across main battery 12 when switch 14 is switched into the on or closed position. LED 20 indicates that the line power is on. Additionally, capacitor 41 is connected across connectors 11 and capacitor 42 is connected across connector 13.

The circuit further comprises a charging circuit for auxiliary battery 24. Even if the switch 14 is in the off position, auxiliary battery 24 will charge when main battery 12 is connected into the circuit. This is achieved by the charging circuit including solid state circuit breaker 26 which is another Polyswitch TM from Raychem, blocking diode 28, current limiting resistor 30 and a thermostat 32 which is disposed next to the auxiliary battery and is set to cut off charging when the battery reaches a temperature of greater than 117° to 120° F. since such temperature usually indicates an overcharging condition.

LED indicator lamp 37 and serially connected current limiting resistor 44 are provided to show that current is being supplied to auxiliary battery 24 to indicate charging is present.

It should also be noted that circuit breaker 26 may be disposed on the case of battery 24 in order to provide further protection against over-heating of the auxiliary battery, either during charging or due to some other malfunction, since such breakers are temperature sensitive.

The interface housing for unit 8 is preferably 5.3" high by 4" wide and 1.4" deep and weighs less than 1.5 pounds.

In operation, when battery 12 is put into position and switch 34 is pushed inwardly as a result of the connection, switch 34 is in the open state as shown in FIG. 3. The indicator light 37 will be illuminated since it is connected directly across the battery 12. In this state, main battery 12 can still charge auxiliary battery 24 through circuit elements 26, 28, 30 and 32.

In order to apply power to the load, in this case the camera 10, switch 14 is thrown to the on position whereupon the switch contacts shown in FIG. 3 are closed.

A lead 33 connects the junction of switch 34 and a blocking diode 36 to the switch 14. The switch 14, when operated to the closed state, connects the lead 33 to an LED indicator 38 and its serially connected current limiting resistor 39. However, the LED 38 remains dark as long as battery 12 remains connected since the switch 34 remains open.

When the camera user sees the low battery indicator light, he is advised that the main battery 12 is low and needs to be changed. Accordingly, the user then removes battery 12 from the interface unit 8. Upon removing battery 12, switch 34 will now close, connecting auxiliary battery 24 across load 10 through the circuit including blocking diode 36, circuit breaker 18 and switch 14. At the same time, power will be supplied to indicator light 38 indicating that auxiliary power is on.

Auxiliary battery 24 has the ability to power the load for three to sixteen minutes, giving the user sufficient time to reattach a fully charged main battery. For typical cameras the normal time for changing the battery is approximately 30 seconds.

Moreover, it will be appreciated that the battery 24 is automatically charged by the battery 12 through the circuit comprising blocking diode 28, current limiting resistor 30, breaker 26 and switch 32. Additionally, the charging cycle of battery 24 is selected to be substantially less than the power cycle of battery 12 thereby insuring fully charged batter 24 each time it is used. The current regulating transistor 46 will maintain constant current through LED 37 until almost the end of the charging cycle.

As a result, the device according to the present invention provides an uninterrupted power supply for a camera or similar device.

FIG. 4 illustrates a modified embodiment of the circuit of the present invention. Similar reference characters in the FIGURES indicate identical elements. In the circuit of FIG. 4 the battery 12 is connected to the input of voltage regulator 50, the output terminals of which are connected to the input terminals of a DC to DC converter 52. The output of converter 52 is connected to blocking diode 28. Current regulating transistor 46 extends the sensitivity of LED 37 so the LED remains illuminated almost until the end of the charging cycle to indicating charging. Thus, the emitter electrode is connected to one end of the resistor 30 and base biasing resistor 48 is connected between the base electrode and the other end of resistor 30. The LED is connected to the collector electrode.

The operation of the circuit of FIG. 4 is identical to the operation of the circuit of FIG. 3 with the exception that voltage regulator 50 maintains a substantially constant voltage at its output over a fairly wide range of inputs such as 10–18 volts. Thus, the converter 52 maintains a substantially constant charging current although there may be wide swings of the input voltage. Thus, the charging current is made independent of the voltage of the input battery 12 over a wide range.

It will be appreciated that the instant specification and claims are set forth by way of illustration and not limitation, and that various modifications and changes may be made without departing from the spirit and scope of the present invention.

What is claimed is:

1. A stand-by power supply comprising:
   first connector means for electrically connecting to a load;
   second connector means for electrically connecting to and disconnecting from a main battery;
   an auxiliary battery;
   circuit means electrically connected to the first and second connector means and the auxiliary battery for applying the main battery across the load and responsive to the disconnecting of the main battery from the second connector means to apply the auxiliary battery across the load.

2. A stand-by power supply comprising:
   first connector means for electrically connecting to a load;
   second connector means for electrically connecting to and disconnecting from a main battery;
   an auxiliary battery;
   circuit means electrically connected to the first and second connector means and the auxiliary battery for applying the main battery across the load and responsive to the disconnecting of the main battery from the second connector means to apply the auxiliary battery across the load;

said circuit means comprising switching means connected in series with the auxiliary battery and switchable from an open state to a closed state in response to the disconnection of the main battery;

said power supply further comprising a housing having the auxiliary battery and circuit means therein and having two main faces and wherein the first and second connector means are disposed on the two main faces.

3. The stand-by power supply accordance to claim 2, wherein the housing is substantially a rectangular solid and the first and second connector means comprises banana connectors on the two main faces.

4. The stand-by power supply according to claim 2, wherein the switching means comprises a microswitch having a movable member disposed at one of the main faces and responsive to the connecting and disconnecting of the main battery to the connector for switching the microswitch from the open to the closed state.

5. The stand-by power supply according to claim 1, wherein the circuit means comprises power switching means connected in series with the main battery for opening and closing the connection to the load.

6. The stand-by power supply according to claim 1, wherein the circuit means further includes indicating means connected to said recharging means for indicating recharging of said auxiliary battery, and current regulating means serially connected to said indicating means to maintain said indicating means operable until substantially the end of the charging cycle.

7. The stand-by power supply according to claim 1, in which said recharging means further includes a constant current generator for supplying a constant current to said auxiliary battery irrespective of changes in the output voltage of the main battery over a substantial range of operation.

8. The stand-by power supply according to claim 7, in which said constant current generator comprises a voltage regulator and a serially connected dc to dc converter.

9. The stand-by power supply according to claim 1, wherein the circuit means further comprises indicator lights connected in parallel with the batteries for indicating when the auxiliary battery is charging, when the main battery is applied across the load and when the auxiliary battery is applied across the load.

10. The stand-by power supply according to claim 1, wherein the circuit means further comprises circuit breaking means for preventing overcharging of the auxiliary battery and for preventing high current from the batteries to the load.

11. The stand-by power supply according to claim 1, wherein the circuit means is disposed adjacent the auxiliary battery, said circuit means being responsive to the temperature of the auxiliary battery for preventing charging thereof when the temperature of the auxiliary battery exceeds a predetermined temperature.

* * * * *